United States Patent
Qiu (10) Patent No.: US 10,218,761 B2
(45) Date of Patent: Feb. 26, 2019

(54) METHOD AND DEVICE FOR ADJUSTING BIT RATE IN VIDEO CALLING BASED ON VOICE OVER LONG-TERM EVOLUTION AND VIDEO OVER LONG-TERM EVOLUTION, AND MOBILE TERMINAL

(71) Applicant: Spreadtrum Communications (Shanghai) Co., Ltd., Shanghai (CN)

(72) Inventor: Yi Qiu, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 32 days.

(21) Appl. No.: 15/369,757

(22) Filed: Dec. 5, 2016

(65) Prior Publication Data

US 2017/0187774 A1    Jun. 29, 2017

(30) Foreign Application Priority Data

Dec. 29, 2015    (CN) .......................... 2015 1 1015841

(51) Int. Cl.
*H04L 29/06* (2006.01)
*H04L 12/26* (2006.01)

(52) U.S. Cl.
CPC ........ *H04L 65/601* (2013.01); *H04L 43/0835* (2013.01); *H04L 65/608* (2013.01); *H04L 65/1016* (2013.01); *H04L 65/80* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,426,418 | B2* | 8/2016 | Van der Auwera | .... H04N 7/147 |
| 2005/0185655 | A1* | 8/2005 | Blanc | .................. H04W 28/16 |
| | | | | 370/395.41 |
| 2007/0153686 | A1* | 7/2007 | Xiang | ..................... H04L 47/10 |
| | | | | 370/229 |
| 2010/0316066 | A1* | 12/2010 | Leung | ............. H04N 21/44209 |
| | | | | 370/468 |
| 2011/0128967 | A1* | 6/2011 | Belling | .............. H04L 65/1043 |
| | | | | 370/401 |
| 2013/0159495 | A1* | 6/2013 | Wang | .................. H04N 19/146 |
| | | | | 709/224 |
| 2016/0277274 | A1* | 9/2016 | Burman | ............. H04L 43/0876 |

* cited by examiner

Primary Examiner — Jason E Mattis
(74) Attorney, Agent, or Firm — Vierra Magen Marcus LLP (57) ABSTRACT

Method and device for adjusting bit rate in video calling based on VoLTE, and mobile terminal are provided. The method includes: determining whether the data receiver transmits a TMMBR packet for the first time or has received a TMMBN packet from a data transmitter, or whether the number of times a same TMMBR packet has been retransmitted exceeds a predetermined time; if yes, estimating downlink reception bit rate and calculating downlink packet loss rate of RTP packet; calculating transmission bit rate of the data transmitter which is requested by the data receiver based on the estimated downlink reception bit rate and the calculated downlink packet loss rate of RTP packet; and transmitting the TMMBR packet to the data transmitter based on the transmission bit rate of the data transmitter. A bit rate can be dynamically adjusted based on actual network bandwidth, which may improve quality of video calling.

17 Claims, 5 Drawing Sheets

METHOD AND DEVICE FOR ADJUSTING BIT RATE IN VIDEO CALLING BASED ON VOICE OVER LONG-TERM EVOLUTION AND VIDEO OVER LONG-TERM EVOLUTION, AND MOBILE TERMINAL

CROSS-REFERENCE TO RELATED APPLICATIONS

The present application claims priority to Chinese patent application No. 201511015841.0, filed on Dec. 29, 2015, and entitled "METHOD AND DEVICE FOR ADJUSTING BIT RATE IN VIDEO CALLING BASED ON VOICE OVER LONG-TERM EVOLUTION AND VIDEO OVER LONG-TERM EVOLUTION, AND MOBILE TERMINAL", and the entire disclosure of which is incorporated herein by reference.

TECHNICAL FIELD

The present disclosure generally relates to video calling technology, and more particularly, to a method and device for adjusting bit rate in video calling based on Voice over Long-Term Evolution and Video over Long-Term Evolution, and a mobile terminal.

BACKGROUND

Voice over Long-Term Evolution and Video over Long-Term Evolution (VoLTE) are standards for voice and video communications and based on LTE network and IP Multimedia Subsystem (IMS) network, where the LTE network is used for service access, and the IMS network is used for service control. The VoLTE supports various communication services, such as High Definition (HD) voice or HD video, and is compatible with voice in 2G/3G network.

As the core service of VoLTE, video calling service has provided new calling experience for users of mobile terminals. During video calling, the video quality draws the most attention from the users. When the video calling is performed, the mobile terminal configures a bit rate of video coding based on a resolution and a frame rate of a video. If the bit rate is too large, network packet loss may occur and further mosaics may exist on a video at an opposite terminal, which causes poor user experience.

A common bit rate configuration method includes: taking a network bandwidth which is negotiated by two parties involved in a calling when the calling is established as a reference value, and dynamically adjusting a bit rate based on the reference value.

The inventor found that, in existing techniques, the negotiated network bandwidth is an experience value, and cannot represent an accurate bandwidth in a current network situation. The bit rate dynamically adjusted based on the negotiated network bandwidth may not lead good quality of video calling.

SUMMARY

In embodiments of the present disclosure, a method and device for adjusting bit rate in video calling based on VoLTE, and a mobile terminal are provided. A bit rate can be dynamically adjusted based on actual network bandwidth, which may improve quality of video calling.

In an embodiment of the present disclosure, a method for adjusting bit rate in video calling based on VoLTE is provided. The method is applied to a data receiver which is adapted to transmit a Temporary Maximum Media Stream Bit Rate Request (TMMBR) packets, and includes: determining whether the data receiver transmits a TMMBR packet for the first time, or whether the data receiver has received a Temporary Maximum Media Stream Bit Rate Notification (TMMBN) packet from a data transmitter, or whether the number of times a same TMMBR packet has been retransmitted exceeds a predetermined time; if the data receiver transmits the TMMBR packet for the first time or has received the TMMBN packet from the data transmitter, or the number of times the same TMMBR packet has been retransmitted exceeds the predetermined time, estimating a downlink reception bit rate and calculating a downlink packet loss rate of Real-time Transport Protocol (RTP) packet; calculating a transmission bit rate of the data transmitter which is requested by the data receiver based on the estimated downlink reception bit rate and the calculated downlink packet loss rate of RTP packet; and transmitting the TMMBR packet to the data transmitter based on the transmission bit rate of the data transmitter which is requested by the data receiver.

Optionally, the method may further include: if the data receiver does not transmit the TMMBR packet for the first time or hasn't received the TMMBN packet from the data transmitter, or the number of times the same TMMBR packet has been retransmitted does not exceed the predetermined time, transmitting the TMMBR packet to the data transmitter based on a last transmission bit rate of the data transmitter which is estimated by the data receiver last time.

Optionally, estimating a downlink reception bit rate may include: when $t_{cur} \geq t_{start}+t_{period}$, updating an average bit rate $b_{prev}$ in a last statistic period based on Equation (1), $$b_{prev}=(s_{total}-s_{prev}) \times 8/(t_{cur}-t_{start}), t_{start}>0 \qquad (1),$$

where $s_{total}$ is an accumulation value of effective load length of a current RTP packet, $s_{prev}$ is an accumulation value of effective load length of a RTP packet in the last period, $t_{cur}$ is a current time point, and $t_{start}$ is a time point when a first packet is received within the current period, $t_{period}$ is a time period, and after each statistic period ends, $t_{start}$ is reset and $s_{prev}$ is updated to be $s_{total}$; and when $t_{cur} \in [t_{start}, t_{start}+t_{period})$ updating the downlink reception bit rate based on Equation (2), $$b_{est}=(1-\alpha) \cdot b_{prev}+\alpha \cdot b_{cur} \qquad (2),$$

where $b_{est}$ is an estimation value of the downlink reception bit rate, $b_{prev}$ is an average bit rate in the last statistic period, and $b_{cur}$ is a current average bit rate, and $\alpha$ is a weight coefficient which depends upon Equation (3), $$\alpha = \begin{cases} \frac{3}{4}, & (t_{cur}-t_{start}) \geq 0.8 \times t_{period} \\ \frac{1}{2}, & 0.4 \times t_{period} \leq (t_{cur}-t_{start}) < 0.8 \times t_{period} \\ \frac{1}{4}, & 0.2 \times t_{period} \leq (t_{cur}-t_{start}) < 0.4 \times t_{period} \\ 0, & (t_{cur}-t_{start}) < 0.2 \times t_{period} \end{cases} \qquad (3)$$

Optionally, calculating a downlink packet loss rate of RTP packet may include: if the cumulative number of RTP packets which should have been received is greater than or equal to a threshold $N_{thres}$, calculating the downlink packet loss rate $p_{loss}$ based on Equation (4), $$p_{loss}=(S_{last}-S_{start}-N_{recv})/(S_{last}-S_{start}), S_{last}-S_{start} \geq N_{thres} \qquad (4),$$

where $S_{last}$ is a sequence number of a latest RTP packet, $S_{start}$ is a sequence number of a first RTP packet in a statistic period, and $N_{recv}$ is the number of RTP packets actually received in the statistic period.

Optionally, calculating a transmission bit rate of the data transmitter which is requested by the data receiver based on the estimated downlink reception bit rate and the calculated downlink packet loss rate of RTP packet may include:

if $p_{loss} \geq p_1$ and $p_1$ is a first predetermined threshold of packet loss rate, determining n=0, initiating stepping length $h_0$, and calculating the transmission bit rate of the data transmitter $b_{TMMBR}$ based on Equations (5) and (6), $$h_0 = \beta \cdot b_{est} \quad (5)$$

$$b_{TMMBR} = b_{est} - h_n \quad (6)$$

where $\beta$ is a ratio coefficient, and $0 < \beta < 1$; and
letting n=n+1, if $p_{loss} \geq p_2$ and $p_2$ is a second predetermined threshold of packet loss rate, updating the stepping length $h_n$ based on Equation (7), $$h_n = \begin{cases} \beta \cdot b_{est}, & p_{loss} > p_1 \\ \lambda \cdot h_{n-1}, & p_1 > p_{loss} \geq 0 \end{cases} \quad (7)$$

where $\lambda$ is a constant, $0 < \lambda < 1$, $p_2$ is a convergence value of packet loss rate and $0 < p_2 < p_1$; or
if $p_2 \leq p_{loss} < p_1$ and $h_n \geq h_{min}$, calculating $b_{TMMBR}$ based on Equation (6); or
if $0 \leq p_{loss} < p_1$ and $h_n \geq h_{min}$, calculating $b_{TMMBR}$ based on Equation (8), $$b_{TMMBR} = b_{est} + h_n \quad (8).$$

In an embodiment of the present disclosure, a method for adjusting bit rate in video calling based on VoLTE is provided. The method is applied to a data transmitter which is adapted to receive TMMBR packets, and includes: receiving a TMMBR packet from a data receiver, wherein the TMMBR packet is sent based on a transmission bit rate of the data transmitter which is requested by the data receiver when the data receiver transmits the TMMBR packet for the first time or receives a first TMMBN packet from the data transmitter, or when the number of times the same TMMBR packet has been retransmitted exceeds a predetermined time, wherein the transmission bit rate of the data transmitter which is requested by the data receiver is calculated by the data receiver based on an estimated downlink reception bit rate and a calculated downlink packet loss rate of RTP packet; transmitting a second TMMBN packet to the data receiver; obtaining bit rate information requested by the data receiver by analyzing the TMMBR packet; calculating a coding bit rate to be configured based on the bit rate information requested by the data receiver; and performing coding bit rate configuration based on the coding bit rate to be configured.

Optionally, calculating a coding bit rate to be configured based on the bit rate information requested by the data receiver may include: calculating the coding bit rate to be configured $b_{config}$ based on Equation (9), $$b_{config} = \begin{cases} b_{TMMBR}, & b_{MIN} \leq b_{TMMBR} \leq b_{MAX} \\ \min(b_{TMMBR}, b_{MAX}), & b_{TMMBR} > b_{MAX} \\ \max(b_{TMMBR}, b_{MIN}), & b_{TMMBR} < b_{MIN} \end{cases} \quad (9)$$

where $b_{TMMBR}$ is the bit rate obtained from the TMMBR packet, and $b_{MAX}$ and $b_{MIN}$ are the maximum and minimum values in a coding bit rate configuration section respectively.

In an embodiment of the present disclosure, a device for adjusting bit rate in video calling based on VoLTE is provided. The device is applied in a data receiver which is adapted to transmit TMMBR packets, and includes: a determining unit, configured to determine whether the data receiver transmits a TMMBR packet for the first time, or whether the data receiver has received a TMMBN packet from a data transmitter, or whether the number of times a same TMMBR packet has been retransmitted exceeds a predetermined time; an estimating unit, configured to: if the data receiver transmits the TMMBR packet for the first time or has received the TMMBN packet from the data transmitter, or the number of times the same TMMBR packet has been retransmitted exceeds the predetermined time, estimate a downlink reception bit rate; a first calculating unit, configured to calculate a downlink packet loss rate of RTP packet; a second calculating unit, configured to calculate a transmission bit rate of the data transmitter which is requested by the data receiver based on the estimated downlink reception bit rate and the calculated downlink packet loss rate of RTP packet; and a first transmitting unit configured to transmit the TMMBR packet to the data transmitter based on the transmission bit rate of the data transmitter which is requested by the data receiver.

Optionally, the first transmitting unit may be further configured to: if the data receiver does not transmit the TMMBR packet for the first time or hasn't received the TMMBN packet from the data transmitter, or the number of times the same TMMBR packet has been retransmitted does not exceed the predetermined time, transmit the TMMBR packet to the data transmitter based on a last transmission bit rate of the data transmitter which is estimated by the data receiver last time.

Optionally, the estimating unit may be configured to:
when $t_{cur} \geq t_{start} + t_{period}$, update an average bit rate $b_{prev}$ in a last statistic period based on Equation (1), $$b_{prev} = (s_{total} - s_{prev}) \times 8 / (t_{cur} - t_{start}), t_{start} > 0 \quad (1),$$

where $s_{total}$ is an accumulation value of effective load length of a current RTP packet, $s_{prev}$ is an accumulation value of effective load length of a RTP packet in the last period, $t_{cur}$ is a current time point, and $t_{start}$ is a time point when a first packet is received within the current period, $t_{period}$ is a time period, and after each statistic period ends, $t_{start}$ is reset and $s_{prev}$ is updated to be $s_{total}$; and
when $t_{cur} \in [t_{start}, t_{start} + t_{period})$, update the downlink reception bit rate based on Equation (2), $$b_{est} = (1-\alpha) \cdot b_{prev} + \alpha \cdot b_{cur} \quad (2),$$

where $b_{est}$ is an estimation value of the downlink reception bit rate, $b_{prev}$ is an average bit rate in the last statistic period, and $b_{cur}$ is a current average bit rate, and $\alpha$ is a weight coefficient which depends upon Equation (3), $$\alpha = \begin{cases} \dfrac{3}{4}, & (t_{cur} - t_{start}) \geq 0.8 \times t_{period} \\ \dfrac{1}{2}, & 0.4 \times t_{period} \leq (t_{cur} - t_{start}) < 0.8 \times t_{period} \\ \dfrac{1}{4}, & 0.2 \times t_{period} \leq (t_{cur} - t_{start}) < 0.4 \times t_{period} \\ 0, & (t_{cur} - t_{start}) < 0.2 \times t_{period} \end{cases} \quad (3)$$

Optionally, the first calculating unit may be configured to: if the cumulative number of RTP packets which should have been received is greater than or equal to a threshold $N_{thres}$, calculate the downlink packet loss rate $p_{loss}$ based on Equation (4), $$p_{loss}=(S_{last}-S_{start}-N_{recv})/(S_{last}-S_{start}), S_{last}-S_{start} \geq N_{thres} \quad (4)$$

where $S_{last}$ is a sequence number of a latest RTP packet, $S_{start}$ is a sequence number of a first RTP packet in a statistic period, and $N_{recv}$ is the number of RTP packets actually received in the statistic period.

Optionally, the second calculating unit may be configured to:

if $p_{loss} \geq p_1$ and $p_1$ is a first predetermined threshold of packet loss rate, determine n=°, initiate stepping length $h_0$, and calculate the transmission bit rate of the data transmitter $b_{TMMBR}$ based on Equations (5) and (6), $$h_0 = \beta \cdot b_{est} \quad (5)$$

$$b_{TMMBR} = b_{est} - h_n \quad (6)$$

where $\beta$ is a ratio coefficient, and $0<\beta<1$; and let n=n+1, if $p_{loss} \geq p_2$ and $p_2$ is a second predetermined threshold of packet loss rate, update the stepping length $h_n$ based on Equation (7), $$h_n = \begin{cases} \beta \cdot b_{est}, & p_{loss} > p_1 \\ \lambda \cdot h_{n-1}, & p_1 > p_{loss} \geq 0 \end{cases} \quad (7)$$

where $\lambda$ is a constant, $0<\lambda<1$, $p_2$ is a convergence value of packet loss rate and $0<p_2<p_1$; or if $p_2 \leq p_{loss} < p_1$ and $h_n \geq h_{min}$, calculate $b_{TMMBR}$ based on Equation (6); or if $0 \leq p_{loss} < p_2$ and $h_n \geq h_{min}$, calculate $b_{TMMBR}$ based on Equation (8), $$b_{TMMBR} = b_{est} + h_n \quad (8).$$

In an embodiment of the present disclosure, a device for adjusting bit rate in video calling based on VoLTE is provided. The device is applied in a data transmitter which is adapted to receive TMMBR packets, and includes: a receiving unit configured to receive a TMMBR packet from a data receiver, wherein the TMMBR packet is sent based on a transmission bit rate of the data transmitter which is requested by the data receiver when the data receiver transmits the TMMBR packet for the first time or receives a first TMMBN packet from the data transmitter, or when the number of times the same TMMBR packet has been retransmitted exceeds a predetermined time, wherein the transmission bit rate of the data transmitter which is requested by the data receiver is calculated by the data receiver based on an estimated downlink reception bit rate and a calculated downlink packet loss rate of RTP packet; a second transmitting unit, configured to transmit a second TMMBN packet to the data receiver; an analyzing unit, configured to analyze the TMMBR packet to obtain bit rate information requested by the data receiver; a third calculating unit, configured to calculate a coding bit rate to be configured based on the bit rate information requested by the data receiver; and a configuring unit, configured to perform coding bit rate configuration based on the coding bit rate to be configured.

Optionally, the third calculating unit may be configured to: calculate the coding bit rate to be configured $b_{config}$ based on Equation (9), $$b_{config} = \begin{cases} b_{TMMBR}, & b_{MIN} \leq b_{TMMBR} \leq b_{MAX} \\ \min(b_{TMMBR}, b_{MAX}), & b_{TMMBR} > b_{MAX} \\ \max(b_{TMMBR}, b_{MIN}), & b_{TMMBR} < b_{MIN} \end{cases} \quad (9)$$

where $b_{TMMBR}$ is the bit rate obtained from the TMMBR packet, and $b_{MAX}$ and $b_{MIN}$ are the maximum and minimum values in a coding bit rate configuration section respectively.

In an embodiment of the present disclosure, a mobile terminal is provided, including the above device for adjusting bit rate in video calling based on VoLTE which is applied in a data receiver.

In an embodiment of the present disclosure, a mobile terminal is provided, including the above device for adjusting bit rate in video calling based on VoLTE which is applied in a data transmitter.

In embodiments of the present disclosure, if the data receiver transmits a TMMBR packet for the first time or has received a TMMBN packet from the data transmitter, or the number of times a same TMMBR packet has been retransmitted exceeds the predetermined time, the downlink reception bit rate is estimated and the downlink packet loss rate of RTP packet is calculated, the transmission bit rate of the data transmitter which is requested by the data receiver is calculated based on the estimated downlink reception bit rate and the calculated downlink packet loss rate of RTP packet; and the TMMBR packet is transmitted to the data transmitter based on the transmission bit rate of the data transmitter, so that the data transmitter is capable of analyzing the TMMBR packet to obtain the bit rate information requested by the data receiver, calculating the coding bit rate to be configured, and performing coding bit rate configuration based on the coding bit rate to be configured. In this way, a bit rate can be dynamically adjusted based on actual network bandwidth, which may improve quality of video calling.

DETAILED DESCRIPTION

In order to clarify the object, solutions and advantages of embodiments of the present disclosure, embodiments of present disclosure will be described clearly in detail in conjunction with accompanying drawings. The embodiments below are only described for example, and there are many other possible embodiments. Based on the embodiments below, all the other embodiments obtained by those skilled in the art without any creative efforts should belong to the scope of the present disclosure.

Figure 1:
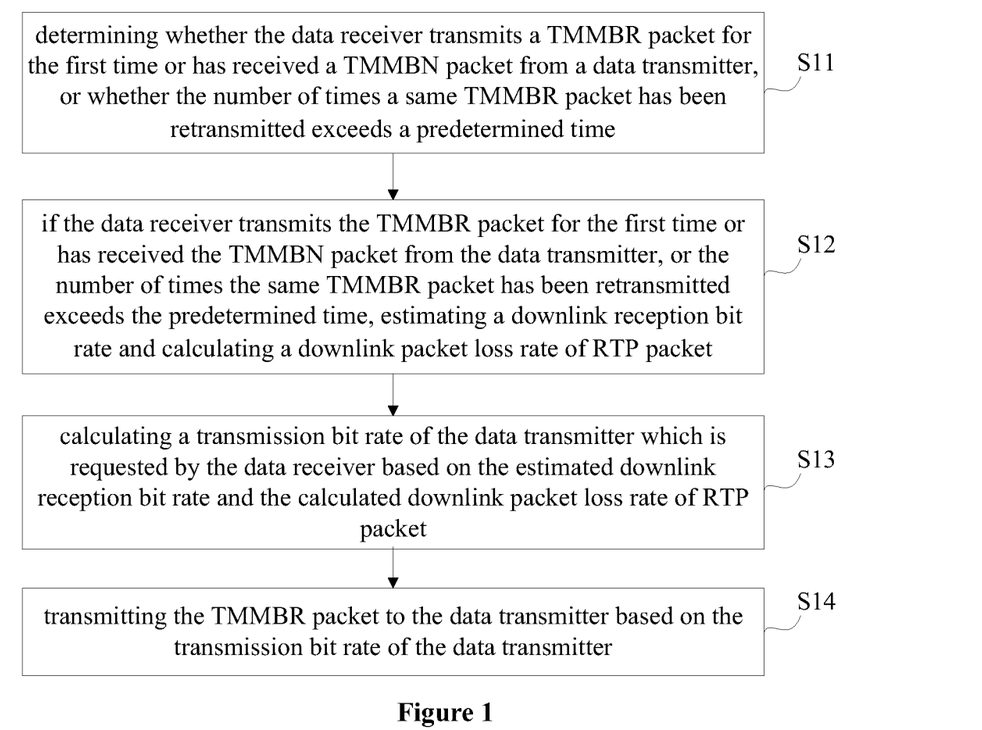
FIG. 1 schematically illustrates a flow chart of a method for adjusting bit rate in video calling based on VoLTE according to an embodiment.

In an embodiment, a method for adjusting bit rate in video calling based on VoLTE is provided. The method is applied to a data receiver which is adapted to transmit TMMBR packets. Referring to FIG. 1, the method may include following steps:

S11, determining whether the data receiver transmits a TMMBR packet for the first time, or whether the data receiver has received a TMMBN packet from a data transmitter, or whether the number of times a same TMMBR packet has been retransmitted exceeds a predetermined time (in some embodiments, the predetermined time may be twice);

S12, if the data receiver transmits the TMMBR packet for the first time or has received the TMMBN packet from the data transmitter, or the number of times the same TMMBR packet has been retransmitted exceeds the predetermined time, estimating a downlink reception bit rate and calculating a downlink packet loss rate of RTP packet;

S13, calculating a transmission bit rate of the data transmitter which is requested by the data receiver based on the estimated downlink reception bit rate and the calculated downlink packet loss rate of RTP packet; and S14, transmitting the TMMBR packet to the data transmitter based on the transmission bit rate of the data transmitter.

In the method, if the data receiver transmits a TMMBR packet for the first time or has received a TMMBN packet from the data transmitter, or the number of times a same TMMBR packet has been retransmitted exceeds the predetermined time, the downlink reception bit rate is estimated and the downlink packet loss rate of RTP packet is calculated, the transmission bit rate of the data transmitter which is requested by the data receiver is calculated based on the estimated downlink reception bit rate and the calculated downlink packet loss rate of RTP packet; and the TMMBR packet is transmitted to the data transmitter based on the transmission bit rate of the data transmitter, so that the data transmitter is capable of analyzing the TMMBR packet to obtain the bit rate information requested by the data receiver, calculating the coding bit rate to be configured, and performing coding bit rate configuration based on the coding bit rate to be configured. In this way, a bit rate can be dynamically adjusted based on actual network bandwidth, which may improve quality of video calling.

Figure 2:
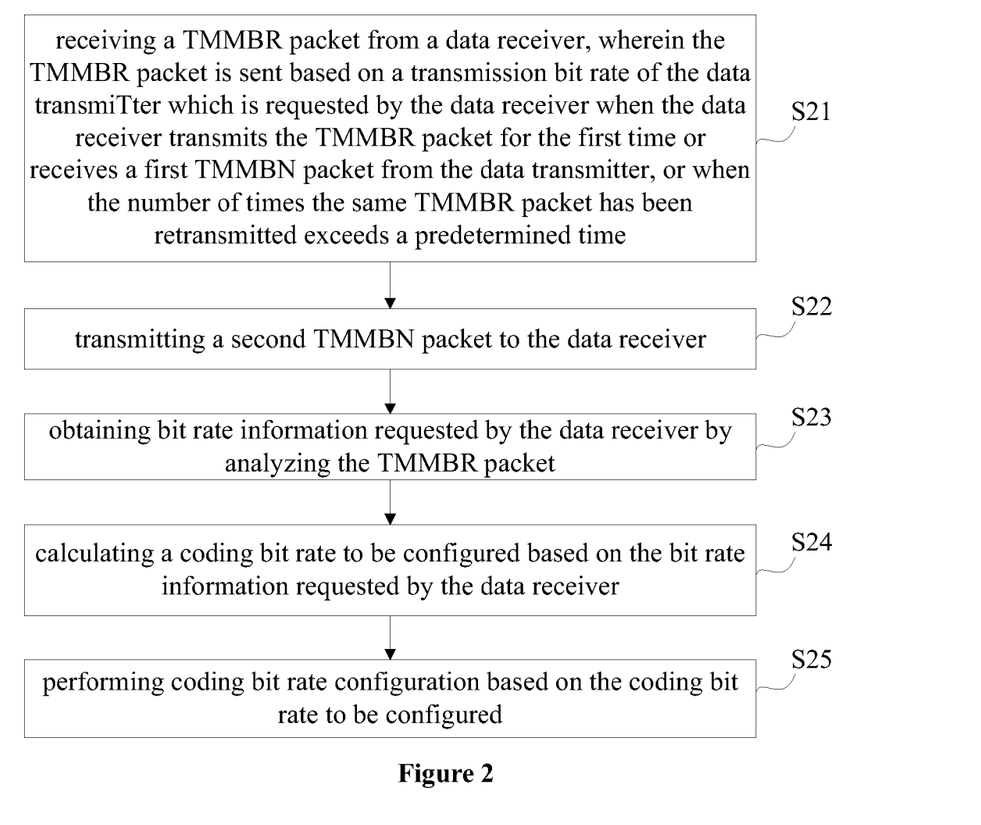
FIG. 2 schematically illustrates a flow chart of a method for adjusting bit rate in video calling based on VoLTE according to another embodiment.

In an embodiment, a method for adjusting bit rate in video calling based on VoLTE is provided. The method is applied to a data transmitter which is adapted to receive TMMBR packets. Referring to FIG. 2, the method may include following steps:

S21, receiving a TMMBR packet from a data receiver, wherein the TMMBR packet is sent based on a transmission bit rate of the data transmitter which is requested by the data receiver when the data receiver transmits the TMMBR packet for the first time or receives a first TMMBN packet from the data transmitter, or when the number of times the same TMMBR packet has been retransmitted exceeds a predetermined time, wherein the transmission bit rate of the data transmitter which is requested by the data receiver is calculated by the data receiver based on an estimated downlink reception bit rate and a calculated downlink packet loss rate of RTP packet;

S22, transmitting a second TMMBN packet to the data receiver;

S23, obtaining bit rate information requested by the data receiver by analyzing the TMMBR packet;

S24, calculating a coding bit rate to be configured based on the bit rate information requested by the data receiver; and S25, performing coding bit rate configuration based on the coding bit rate to be configured.

In the method, the TMMBR packet is received from the data receiver, wherein the TMMBR packet is sent based on a transmission bit rate of the data transmitter which is requested by the data receiver when the data receiver transmits the TMMBR packet for the first time or receives a first TMMBN packet from the data transmitter, or when the number of times the same TMMBR packet has been retransmitted exceeds a predetermined time, and the transmission bit rate of the data transmitter which is requested by the data receiver is calculated by the data receiver based on an estimated downlink reception bit rate and a calculated downlink packet loss rate of RTP packet. The bit rate information requested by the data receiver is obtained by analyzing the TMMBR packet, the coding bit rate to be configured is calculated, and coding bit rate configuration is performed based on the coding bit rate to be configured. In this way, a bit rate can be dynamically adjusted based on actual network bandwidth, which may improve quality of video calling.

Figure 3:
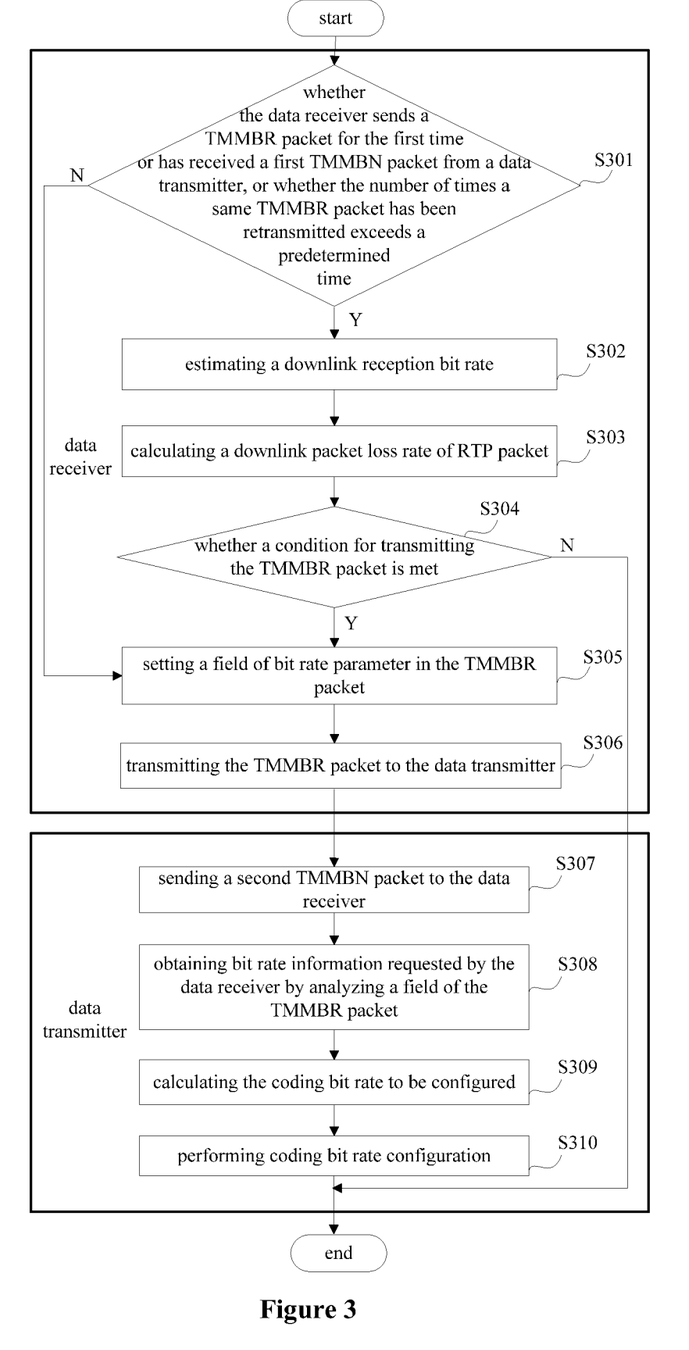
FIG. 3 schematically illustrates a flow chart of a method for adjusting bit rate in video calling based on VoLTE according to another embodiment.

In an embodiment, a method for adjusting bit rate in video calling based on VoLTE is provided. Referring to FIG. 3, the method may include S301 to S310.

In S301, a data receiver determines whether the data receiver transmits a TMMBR packet for the first time, or whether the data receiver has received a first TMMBN packet from a data transmitter, or whether the number of times a same TMMBR packet has been retransmitted exceeds a predetermined time. If the data receiver transmits the TMMBR packet for the first time or has received the first TMMBN packet from the data transmitter, or the number of times the same TMMBR packet has been retransmitted exceeds the predetermined time, the method goes to S302; or else, the method goes to S305.

In some embodiments, the predetermined time may be twice.

In some embodiments, in the VoLTE network, media capability negotiation and session establishment between the data transmitter and the data receiver are performed through Session Initiation Protocol (SIP). When the video calling is established, a video acquisition module at the data transmitter outputs acquisition data to a Digital Signal Processing (DSP) coding module which performs compression coding to the acquisition data and transmits the coded data in RTP packets to the data receiver through network. After receiving the coded data, the data receiver unpacks the RTP packets and outputs the unpacked data to a dithering suppression module. A DSP decoding module obtains video frame data from the dithering suppression module and decodes them, and the decoded data are displayed by a video display module. If loss of the downlink RTP packets occurs at the data receiver, the video may be stuck and mosaics may exist on the video. If the loss is serious, user experience may be greatly affected. To avoid the loss of the downlink RTP packets, the data receiver can request the data transmitter to reduce a video coding bit rate through the TMMBR packet which is an expansion protocol of RTP Control Protocol (RTCP), so that a downlink throughput at the data receiver may be reduced and further a packet loss rate of RTP packets may be reduced. After receiving the TMMBR packet, the data transmitter may send a TMMBN packet to the data receiver as a response.

In S302, the data receiver estimates a downlink reception bit rate.

In some embodiments, once receiving a RTP packet, the data receiver may count effective payload length of the RTP packet and calculate an average bit rate $b_{prev}$ in a last statistic period. Estimating the downlink reception bit rate may include:

when $t_{cur} \geq t_{start} + t_{period}$, updating the average bit rate $b_{prev}$ in the last statistic period based on Equation (1), $$b_{prev} = (s_{total} - s_{prev}) \times 8 / (t_{cur} - t_{start}), t_{start} > 0 \quad (1),$$

where $s_{total}$ is an accumulation value of effective payload length of a current RTP packet, $s_{prev}$ is an accumulation value of effective load length of a RTP packet in the last period, $t_{cur}$ is a current time point, and $t_{start}$ is a time point when a first packet is received within the current period, $t_{period}$ is a time period, and after each statistic period ends, $t_{start}$ is reset and $s_{prev}$ is updated to be $S_{total}$; and when $t_{cur} \in [t_{start}, t_{start} + t_{period})$ updating the downlink reception bit rate based on Equation (2) (the estimation of the downlink reception bit rate is smoothed by weighted averaging), $$b_{est} = (1-\alpha) \cdot b_{prev} + \alpha \cdot b_{cur} \quad (2),$$

where $b_{est}$ is an estimation value of the downlink reception bit rate, $b_{prev}$ is an average bit rate in the last statistic period, and $b_{cur}$ is a current average bit rate, and $\alpha$ is a weight coefficient which is quantized by Equation (3), $$\alpha = \begin{cases} \frac{3}{4}, & (t_{cur} - t_{start}) \geq 0.8 \times t_{peroid} \\ \frac{1}{2}, & 0.4 \times t_{peroid} \leq (t_{cur} - t_{start}) < 0.8 \times t_{peroid} \\ \frac{1}{4}, & 0.2 \times t_{peroid} \leq (t_{cur} - t_{start}) < 0.4 \times t_{peroid} \\ 0, & (t_{cur} - t_{start}) < 0.2 \times t_{peroid} \end{cases} \quad (3)$$

In S303, the data receiver calculates a downlink packet loss rate of RTP packet.

In some embodiments, calculating the downlink packet loss rate of RTP packet may include: if the cumulative number of RTP packets which should have been received is greater than or equal to a threshold $N_{thres}$, calculating the downlink packet loss rate $p_{loss}$ based on Equation (4), $$p_{loss} = (S_{last} - S_{start} - N_{recv}) / (S_{last} - S_{start}), S_{last} - S_{start} \geq N_{thres} \quad (4)$$

where $S_{last}$ last is a sequence number of a latest RTP packet, $S_{start}$ is a sequence number of a first RTP packet in a statistic period, and $N_{recv}$ is the number of RTP packets actually received in the statistic period.

In S304, the data receiver calculates a transmission bit rate of the data transmitter which is requested by the data receiver based on the calculated downlink packet loss rate of RTP packet, and determines whether a condition for transmitting the TMMBR packet is met, and if the condition is met, the method goes to S305, or else, the method ends.

In some embodiments, if a flag bit of transmitting the TMMBR packet is 1, the condition for transmitting the TMMBR packet is met; and if the flag bit of transmitting the TMMBR packet is 0, the condition for transmitting the TMMBR packet is not met.

Figure 4:
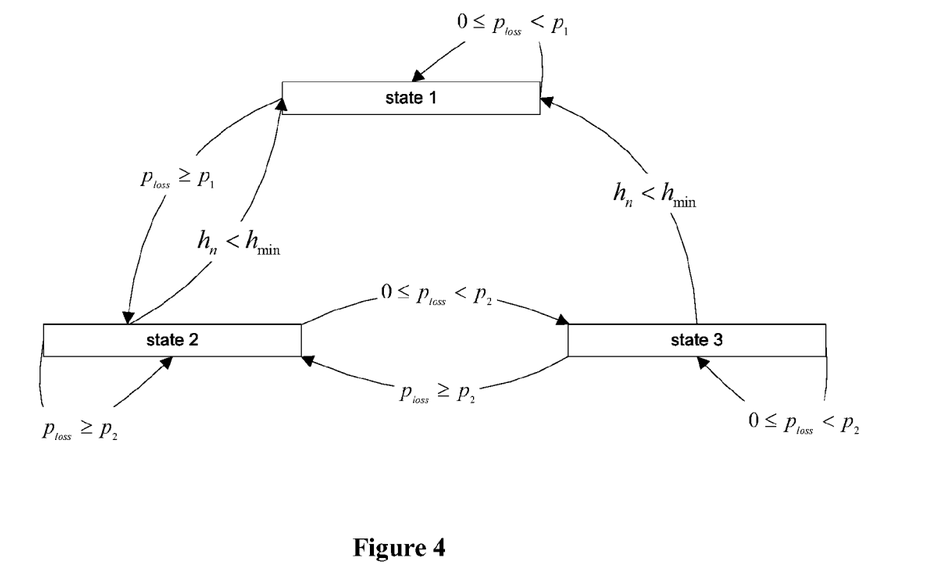
FIG. 4 schematically illustrates an algorithm state transfer diagram during calculation of a transmission bit rate of a data transmitter which is requested by a data receiver in FIG. 3.

Hereinafter, state 1, state 2 and state 3 are algorithm states during the calculation of the transmission bit rate of the data transmitter which is requested by the data receiver.

Referring to FIG. 4, in state 1, if $p_{loss} < p_1$ and $p_1$ is a first predetermined threshold of packet loss rate, it indicates that there is no loss of packet or little loss of packet which does not affect the quality of video calling. Therefore, the algorithm state may not be changed, and the flag bit of transmitting the TMMBR packet is set to be 0. If $p_{loss} \leq p_1$, that is, the algorithm state transfers to state 2, let n=0, initiate stepping length $h_0$, and calculate the transmission bit rate of the data transmitter $b_{TMMBR}$ based on Equations (5) and (6), $$h_0 = \beta \cdot b_{est} \quad (5)$$

$$b_{TMMBR} = b_{est} - h_n \quad (6)$$

where $\beta$ is a ratio coefficient, and $0 < \beta < 1$, $\beta$ is set to be 0.1, and the flag bit of transmitting the TMMBR packet is set to be 1.

In state 2, let n=n+1 if $p_{loss} \geq p_2$ and $p_2$ is a second predetermined threshold of packet loss rate, the stepping length $h_n$ is updated based on Equation (7), $$h_n = \begin{cases} \beta \cdot b_{est}, & p_{loss} > p_1 \\ \lambda \cdot h_{n-1}, & p_1 > p_{loss} \geq 0 \end{cases} \quad (7)$$

where $\lambda$ is a constant, $0 < \lambda < 1$, for example, $\lambda$ is 0.5, $p_2$ is a convergence value of packet loss rate and $0 < p_2 < p_1$, for example, $p_2$ is 0.5%. If $p_2 \leq p_{loss} < p_1$, $b_{TMMBR}$ is calculated based on Equation (6), and the flag bit of transmitting the TMMBR packet is set to be 1; and if $h_n < h_{min}$, the algorithm state transfers to state 1.

If $0 \leq p_{loss} < p_2$, the algorithm state transfers to state 3, $b_{TMMBR}$ is calculated based on Equation (8), $$b_{TMMBR} = b_{est} + h_n \quad (8).$$

and the flag bit of transmitting the TMMBR packet is set to be 1; and if $h_n < h_{min}$, the algorithm state transfers to state 1.

In state 3, let n=n+1, if $p_{loss} \geq p_2$, the algorithm state transfers to state 2, the stepping length $h_n$ is updated based on Equation (7), $b_{TMMBR}$ is calculated based on Equation (6), and the flag bit of transmitting the TMMBR packet is set to be 1; and if $h_n < h_{min}$, the algorithm state transfers to state 1.

If $0 \leq p_{loss} < p_2$, $h_n = h_{n-1}$, $b_{TMMBR}$ is calculated based on Equation (8), the flag bit of transmitting the TMMBR packet is set to be 1, and the algorithm state does not change.

In S305, the data receiver sets a field of bit rate parameter in the TMMBR packet according to $b_{TMMBR}$.

In some embodiments, if it is determined in S301 that the data receiver transmits the TMMBR packet for the first time or has received the first TMMBN packet from the data transmitter, or the number of times the same TMMBR packet has been retransmitted exceeds the predetermined time, the field of bit rate parameter in the TMMBR packet may be set according to $b_{TMMBR}$ calculated in S304. In some embodiments, if it is determined in S301 that the data receiver does not transmit the TMMBR packet for the first time or hasn't received the first TMMBN packet from the data transmitter, or the number of times the same TMMBR packet has been retransmitted does not exceed the predetermined time, the field of bit rate parameter in the TMMBR packet may be set according to $b_{TMMBR}$ which is calculated last time.

In S306, the data receiver transmits the TMMBR packet to the data transmitter.

In S307, after receiving the TMMBR packet from the data receiver, the data transmitter transmits a second TMMBN packet to the data receiver.

In S308, the data transmitter obtains bit rate information requested by the data receiver by analyzing a field of the TMMBR packet.

In S309, the data transmitter calculates the coding bit rate to be configured $b_{config}$ based on Equation (9), $$b_{config} = \begin{cases} b_{TMMBR}, & b_{MIN} \le b_{TMMBR} \le b_{MAX} \\ \min(b_{TMMBR}, b_{MAX}), & b_{TMMBR} > b_{MAX} \\ \max(b_{TMMBR}, b_{MIN}), & b_{TMMBR} < b_{MIN} \end{cases} \quad (9)$$

where $b_{TMMBR}$ is the bit rate obtained from the TMMBR packet, and $b_{MAX}$ and $b_{MIN}$ are the maximum and minimum values in a coding bit rate configuration section respectively.

In S310, a DSP coding module at the data transmitter performs coding bit rate configuration based on the coding bit rate to be configured $b_{config}$.

In some embodiments, the DSP coding module performs the coding bit rate configuration in the control of a video quality control module at the data transmitter.

Based on above steps, adjustment to the bit rate in video calling between the data transmitter and the data receiver based on VoLTE is completed.

Figure 5:
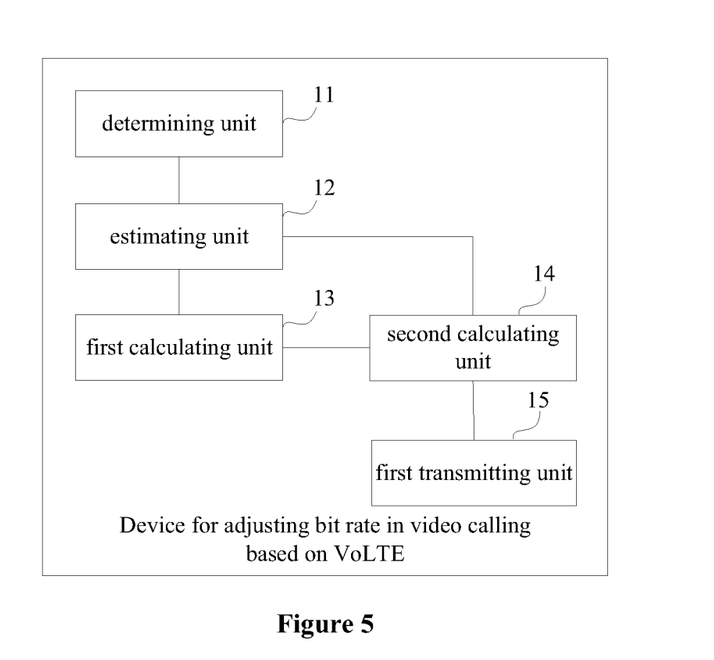
FIG. 5 schematically illustrates a structural diagram of a device for adjusting bit rate in video calling based on VoLTE according to an embodiment.

In an embodiment, a device for adjusting bit rate in video calling based on VoLTE is provided. The device is applied in a data receiver which is adapted to transmit TMMBR packets. Referring to FIG. 5, the device includes:

a determining unit 11, configured to determine whether the data receiver transmits a TMMBR packet for the first time, or whether the data receiver has received a TMMBN packet from a data transmitter, or whether the number of times a same TMMBR packet has been retransmitted exceeds a predetermined time (in some embodiments, the predetermined time may be twice);

an estimating unit 12, configured to: if the data receiver transmits the TMMBR packet for the first time or has received the TMMBN packet from the data transmitter, or the number of times the same TMMBR packet has been retransmitted exceeds the predetermined time, estimate a downlink reception bit rate;

a first calculating unit 13 configured to calculate a downlink packet loss rate of RTP packet;

a second calculating unit 14, configured to calculate a transmission bit rate of the data transmitter which is requested by the data receiver based on the estimated downlink reception bit rate and the calculated downlink packet loss rate of RTP packet; and a first transmitting unit 15 configured to transmit the TMMBR packet to the data transmitter based on the transmission bit rate of the data transmitter.

In embodiments of the present disclosure, if the data receiver transmits a TMMBR packet for the first time or has received the TMMBN packet from the data transmitter, or the number of times a same TMMBR packet has been retransmitted exceeds the predetermined time, the downlink reception bit rate is estimated and the downlink packet loss rate of RTP packet is calculated, the transmission bit rate of the data transmitter which is requested by the data receiver is calculated based on the estimated downlink reception bit rate and the calculated downlink packet loss rate of RTP packet; and the TMMBR packet is transmitted to the data transmitter based on the transmission bit rate of the data transmitter, so that the data transmitter is capable of analyzing the TMMBR packet to obtain the bit rate information requested by the data receiver, calculating the coding bit rate to be configured, and performing coding bit rate configuration based on the coding bit rate to be configured. In this way, a bit rate can be dynamically adjusted based on actual network bandwidth, which may improve quality of video calling.

In some embodiments, the first transmitting unit 15 may be further configured to: if the data receiver does not transmit the TMMBR packet for the first time or hasn't received the TMMBN packet from the data transmitter, or the number of times the same TMMBR packet has been retransmitted does not exceed the predetermined time, transmit the TMMBR packet to the data transmitter based on a last transmission bit rate of the data transmitter which is estimated by the data receiver last time.

In some embodiments, the estimating unit 12 may be configured to:

when $t_{cur} \ge t_{start} + t_{period}$, update an average bit rate $b_{prev}$ in a last statistic period based on Equation (1), $$b_{prev} = (s_{total} - s_{prev}) \times 8 / (t_{cur} - t_{start}), t_{start} > 0 \quad (1),$$

where $s_{total}$ is an accumulation value of effective load length of a current RTP packet, $s_{prev}$ is an accumulation value of effective load length of a RTP packet in the last period, $t_{cur}$ is a current time point, and $t_{start}$ is a time point when a first packet is received within the current period, $t_{period}$ is a time period, and after each statistic period ends, $t_{start}$ is reset and $s_{prev}$ is updated to be $s_{total}$; and when $t_{cur} \in [t_{start}, t_{start} + t_{period})$ update the downlink reception bit rate based on Equation (2), $$b_{est} = (1-\alpha) \cdot b_{prev} + \alpha \cdot b_{cur} \quad (2),$$

where $b_{est}$ is an estimation value of the downlink reception bit rate, $b_{prev}$ is an average bit rate in the last statistic period, and $b_{cur}$ is a current average bit rate, and $\alpha$ is a weight coefficient which depends upon Equation (3), $$\alpha = \begin{cases} \frac{3}{4}, & (t_{cur} - t_{start}) \ge 0.8 \times t_{peroid} \\ \frac{1}{2}, & 0.4 \times t_{peroid} \le (t_{cur} - t_{start}) < 0.8 \times t_{peroid} \\ \frac{1}{4}, & 0.2 \times t_{peroid} \le (t_{cur} - t_{start}) < 0.4 \times t_{peroid} \\ 0, & (t_{cur} - t_{start}) < 0.2 \times t_{peroid} \end{cases} \quad (3)$$

Optionally, the first calculating unit 13 may be configured to: if the cumulative number of RTP packets which should have been received is greater than or equal to a threshold $N_{thres}$, calculate the downlink packet loss rate $p_{loss}$ based on Equation (4), $$p_{loss} = (S_{last} - S_{start} - N_{recv}) / (S_{last} - S_{start}), S_{last} - S_{start} \ge N_{thres} \quad (4),$$

where $S_{last}$ is a sequence number of a latest RTP packet, $S_{start}$ a sequence number of a first RTP packet in a statistic period, and $N_{recv}$ is the number of RTP packets actually received in the statistic period.

Optionally, the second calculating unit 14 may be configured to:

if $p_{loss} \ge p_1$ and $p_1$ is a first predetermined threshold of packet loss rate, determine n=0, initiate stepping length $h_0$, and calculate the transmission bit rate of the data transmitter $b_{TMMBR}$ based on Equations (5) and (6), $$h_0 = \beta \cdot b_{est} \quad (5)$$

$$b_{TMMBR} = b_{est} - h_n \quad (6)$$

where β is a ratio coefficient, and 0<β<1; and let n=n+1, if $p_{loss} \geq p_2$ and $p_2$ is a second predetermined threshold of packet loss rate, update the stepping length $h_n$ based on Equation (7), $$h_n = \begin{cases} \beta \cdot b_{est}, & p_{loss} > p_1 \\ \lambda \cdot h_{n-1}, & p_1 > p_{loss} \geq 0 \end{cases}, \quad (7)$$

where $\lambda$ is a constant, $0<\lambda<1$, $p_2$ is a convergence value of packet loss rate and $0<p_2<p_1$; or if $p_2 \leq p_{loss} < p_1$ and $h_n \geq h_{min}$, calculate $b_{TMMBR}$ based on Equation (6); or if $0 \leq p_{loss} < p_2$ and $h_n \geq h_{min}$, calculate $b_{TMMBR}$ based on Equation (8), $$b_{TMMBR} = b_{est} + h_n \quad (8).$$

Figure 6:
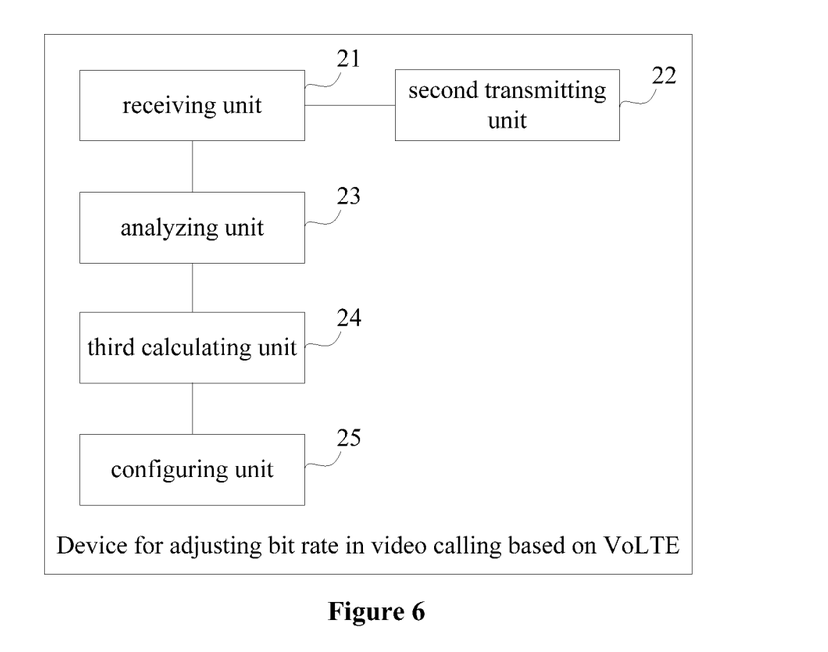
FIG. 6 schematically illustrates a structural diagram of a device for adjusting bit rate in video calling based on VoLTE according to another embodiment.

In an embodiment, a device for adjusting bit rate in video calling based on VoLTE is provided. The device is applied in a data transmitter which is adapted to receive TMMBR packets. Referring to FIG. 6, the device includes:

a receiving unit 21 configured to receive a TMMBR packet from a data receiver, wherein the TMMBR packet is sent based on a transmission bit rate of the data transmitter which is requested by the data receiver when the data receiver transmits the TMMBR packet for the first time or receives a first TMMBN packet from the data transmitter, or when the number of times the same TMMBR packet has been retransmitted exceeds a predetermined time, wherein the transmission bit rate of the data transmitter which is requested by the data receiver is calculated by the data receiver based on an estimated downlink reception bit rate and a calculated downlink packet loss rate of RTP packet;

a second transmitting unit 22 configured to transmit a second TMMBN packet to the data receiver;

an analyzing unit 23 configured to analyze the TMMBR packet to obtain bit rate information requested by the data receiver;

a third calculating unit 24 configured to calculate a coding bit rate to be configured based on the bit rate information requested by the data receiver; and a configuring unit 25 configured to perform coding bit rate configuration based on the coding bit rate to be configured.

By the device, the TMMBR packet is received from the data receiver, wherein the TMMBR packet is sent based on a transmission bit rate of the data transmitter which is requested by the data receiver when the data receiver transmits the TMMBR packet for the first time or receives a first TMMBN packet from the data transmitter, or when the number of times the same TMMBR packet has been retransmitted exceeds a predetermined time, and the transmission bit rate of the data transmitter which is requested by the data receiver is calculated by the data receiver based on an estimated downlink reception bit rate and a calculated downlink packet loss rate of RTP packet. The bit rate information requested by the data receiver is obtained by analyzing the TMMBR packet, the coding bit rate to be configured is calculated, and coding bit rate configuration is performed based on the coding bit rate to be configured. In this way, a bit rate can be dynamically adjusted based on actual network bandwidth, which may improve quality of video calling.

In some embodiments, the third calculating unit 24 may be configured to: calculate the coding bit rate to be configured $b_{config}$ based on Equation (9), $$b_{config} = \begin{cases} b_{TMMBR}, & b_{MIN} \leq b_{TMMBR} \leq b_{MAX} \\ \min(b_{TMMBR}, b_{MAX}), & b_{TMMBR} > b_{MAX} \\ \max(b_{TMMBR}, b_{MIN}), & b_{TMMBR} < b_{MIN} \end{cases}, \quad (9)$$

where $b_{TMMBR}$ is the bit rate obtained from the TMMBR packet, and $b_{MAX}$ and $b_{MIN}$ are the maximum and minimum values in a coding bit rate configuration section respectively.

In an embodiment, a mobile terminal is provided, including the above device for adjusting bit rate in video calling based on VoLTE which is applied in a data receiver.

In an embodiment, a mobile terminal is provided, including the above device for adjusting bit rate in video calling based on VoLTE which is applied in a data transmitter.

In some embodiments, the mobile terminal may be a mobile phone or a Portable Android Device (PAD) supporting the VoLTE standards. However, the present disclosure is not limited thereto.

Those skilled in the art can understand that all of or a portion of the processes in the method provided in the above embodiments can be implemented by related hardware with instruction of computer program. The computer program may be stored in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for adjusting bit rate in video calling based on Voice over Long-Term Evolution and Video over Long-Term Evolution (VoLTE), wherein the method is applied to a data receiver which is adapted to transmit Temporary Maximum Media Stream Bit Rate Request (TMMBR) packets, and comprises:

determining whether the data receiver transmits a TMMBR packet for the first time, or whether the data receiver has received a Temporary Maximum Media Stream Bit Rate Notification (TMMBN) packet from a data transmitter, or whether the number of times a same TMMBR packet has been retransmitted exceeds a predetermined time;

if the data receiver transmits the TMMBR packet for the first time or has received the TMMBN packet from the data transmitter, or the number of times the same TMMBR packet has been retransmitted exceeds the predetermined time, estimating a downlink reception bit rate and calculating a downlink packet loss rate of Real-time Transport Protocol (RTP) packet;

calculating a transmission bit rate of the data transmitter which is requested by the data receiver based on the estimated downlink reception bit rate and the calculated downlink packet loss rate of RTP packet; and transmitting the TMMBR packet to the data transmitter based on the transmission bit rate of the data transmitter which is requested by the data receiver, wherein estimating a downlink reception bit rate comprises:

when $t_{cur} \geq t_{start} + t_{period}$, updating an average bit rate $b_{prev}$ in a last statistic period based on Equation (1), $$b_{prev} = (s_{total} - s_{prev}) \times 8/(t_{cur} - t_{start}), t_{start} > 0 \quad (1),$$

where $s_{total}$ is an accumulation value of effective load length of a current RTP packet, $s_{prev}$ is an accumulation value of effective load length of a RTP packet in the last period, $t_{cur}$ is a current time point, and $t_{start}$ is a time point when a first packet is received within the current period, $t_{period}$ is a time period, and after each statistic period ends, $t_{start}$ is reset and $s_{prev}$ is updated to be $s_{total}$; and when $t_{cur} \in [t_{start}, t_{start}+t_{period})$, updating the downlink reception bit rate based on Equation (2), $$b_{est}=(1-\alpha)\cdot b_{prev}+\alpha\cdot b_{cur} \qquad (2),$$

where $b_{est}$ is an estimation value of the downlink reception bit rate, $b_{prev}$ is an average bit rate in the last statistic period, and $b_{cur}$ is a current average bit rate, and α is a weight coefficient which depends upon Equation (3), $$\alpha = \begin{cases} \frac{3}{4}, & (t_{cur}-t_{start}) \geq 0.8 \times t_{peroid} \\ \frac{1}{2}, & 0.4 \times t_{peroid} \leq (t_{cur}-t_{start}) < 0.8 \times t_{peroid} \\ \frac{1}{4}, & 0.2 \times t_{peroid} \leq (t_{cur}-t_{start}) < 0.4 \times t_{peroid} \\ 0, & (t_{cur}-t_{start}) < 0.2 \times t_{peroid} \end{cases} \qquad (3)$$

2. The method according to claim 1, wherein calculating a downlink packet loss rate of RTP packet comprises:

if the cumulative number of RTP packets which should have been received is greater than or equal to a threshold $N_{thres}$, calculating the downlink packet loss rate $p_{loss}$ based on Equation (4), $$p_{loss}=(S_{last}-S_{start}-N_{recv})/(S_{last}-S_{start}), S_{last}-S_{start} \geq N_{thres} \qquad (4),$$

where $S_{last}$ is a sequence number of a latest RTP packet, $S_{start}$ is a sequence number of a first RTP packet in a statistic period, and $N_{recv}$ is the number of RTP packets actually received in the statistic period.

3. The method according to claim 2, wherein calculating a transmission bit rate of the data transmitter which is requested by the data receiver based on the estimated downlink reception bit rate and the calculated downlink packet loss rate of RTP packet comprises:

if $p_{loss} \geq p_1$ and $p_1$ is a first predetermined threshold of packet loss rate, determining n=0, initiating stepping length $h_0$, and calculating the transmission bit rate of the data transmitter $b_{TMMBR}$ based on Equations (5) and (6), $$h_0=\beta\cdot b_{est} \qquad (5)$$

$$b_{TMMBR}=b_{est}-h \qquad (6)$$

where β is a ratio coefficient, and 0<β<1, and letting n=n+1, if $p_{loss} \geq p_2$ and $p_2$ is a second predetermined threshold of packet loss rate, updating the stepping length $h_n$ based on Equation (7), $$h_n = \begin{cases} \beta\cdot b_{est}, & p_{loss} > p_1 \\ \lambda\cdot h_{n-1}, & p_1 > p_{loss} \geq 0 \end{cases} \qquad (7)$$

where λ is a constant, 0<λ<1, $p_2$ is a convergence value of packet loss rate and 0<$p_2$<$p_1$; or if $p_2 \leq p_{loss} < p_1$ and $h_n \geq h_{min}$, calculating $b_{TMMBR}$ based on Equation (6); or if 0≤$p_{loss}$<$p_2$ and $h_n \geq h_{min}$, calculating $b_{TMMBR}$ based on Equation (8), $$b_{TMMBR}=b_{est}+h_n \qquad (8).$$

4. The method according to claim 1, further comprising: if the data receiver does not transmit the TMMBR packet for the first time and hasn't received the TMMBN packet from the data transmitter, and the number of times the same TMMBR packet has been retransmitted does not exceed the predetermined time, transmitting the TMMBR packet to the data transmitter based on a last transmission bit rate of the data transmitter which is estimated by the data receiver last time.

5. A method for adjusting bit rate in video calling based on Voice over Long-Term Evolution and Video over Long-Term Evolution (VoLTE), wherein the method is applied to a data transmitter which is adapted to receive Temporary Maximum Media Stream Bit Rate Request (TMMBR) packets, and comprises:

receiving a TMMBR packet from a data receiver, wherein the TMMBR packet is sent based on a transmission bit rate of the data transmitter which is requested by the data receiver when the data receiver transmits the TMMBR packet for the first time or receives a first Temporary Maximum Media Stream Bit Rate Notification (TMMBN) packet from the data transmitter, or when the number of times the same TMMBR packet has been retransmitted exceeds a predetermined time, wherein the transmission bit rate of the data transmitter which is requested by the data receiver is calculated by the data receiver based on an estimated downlink reception bit rate and a calculated downlink packet loss rate of Real-time Transport Protocol (RTP) packet;

transmitting a second TMMBN packet to the data receiver;

obtaining bit rate information requested by the data receiver by analyzing the TMMBR packet;

calculating a coding bit rate to be configured based on the bit rate information requested by the data receiver; and performing coding bit rate configuration based on the coding bit rate to be configured, wherein the estimated downlink reception bit rate is obtained at the receiver by:

when $t_{cur} \geq t_{start}+t_{period}$, updating an average bit rate $b_{prev}$ in a last statistic period based on Equation (1), $$b_{prev}=(s_{total}-s_{prev})\times 8/(t_{cur}-t_{start}), t_{start}>0 \qquad (1),$$

where $s_{total}$ is an accumulation value of effective load length of a current RTP packet, $s_{prev}$ is an accumulation value of effective load length of a RTP packet in the last period, $t_{cur}$ is a current time point, and $t_{start}$ is a time point when a first packet is received within the current period, $t_{period}$ is a time period, and after each statistic period ends, $t_{start}$ is reset and $s_{prev}$ is updated to be $s_{total}$; and when $t^{cur} \in [t_{start}, t_{start}+t_{period})$, updating the downlink reception bit rate based on Equation (2), $$b_{est}=(1-\alpha)\cdot b_{prev}+\alpha\cdot b_{cur} \qquad (2),$$

where $b_{est}$ is an estimation value of the downlink reception bit rate, $b_{prev}$ is an average bit rate in the last statistic period, and $b_{cur}$ is a current average bit rate, and α is a weight coefficient which depends upon Equation (3), $$\alpha = \begin{cases} \frac{3}{4}, & (t_{cur} - t_{start}) \geq 0.8 \times t_{peroid} \\ \frac{1}{2}, & 0.4 \times t_{peroid} \leq (t_{cur} - t_{start}) < 0.8 \times t_{peroid} \\ \frac{1}{4}, & 0.2 \times t_{peroid} \leq (t_{cur} - t_{start}) < 0.4 \times t_{peroid} \\ 0, & (t_{cur} - t_{start}) < 0.2 \times t_{peroid} \end{cases} \quad (3)$$

6. The method according to claim 5, wherein calculating a coding bit rate to be configured based on the bit rate information requested by the data receiver comprises:
   calculating the coding bit rate to be configured $b_{config}$ based on Equation (9), $$b_{config} = \begin{cases} b_{TMMBR}, & b_{MIN} \leq b_{TMMBR} \leq b_{MAX} \\ \min(b_{TMMBR}, b_{MAX}), & b_{TMMBR} > b_{MAX} \\ \max(b_{TMMBR}, b_{MIN}), & b_{TMMBR} < b_{MIN} \end{cases} \quad (9)$$

where $b_{TMMBR}$ is the bit rate obtained from the TMMBR packet, and $b_{MAX}$ and $b_{MIN}$ are the maximum and minimum values in a coding bit rate configuration section respectively.

7. A device for adjusting bit rate in video calling based on Voice over Long-Term Evolution and Video over Long-Term Evolution (VoLTE), wherein the device is applied in a data receiver which is adapted to transmit Temporary Maximum Media Stream Bit Rate Request (TMMBR) packets, and comprises:
   a determining circuitry configured to determine whether the data receiver transmits a TMMBR packet for the first time, or whether the data receiver has received a Temporary Maximum Media Stream Bit Rate Notification (TMMBN) packet from a data transmitter, or whether the number of times a same TMMBR packet has been retransmitted exceeds a predetermined time;
   an estimating circuitry, configured to: if the data receiver transmits the TMMBR packet for the first time or has received the TMMBN packet from the data transmitter, or the number of times the same TMMBR packet has been retransmitted exceeds the predetermined time, estimate a downlink reception bit rate;
   a first calculating circuitry configured to calculate a downlink packet loss rate of Real-time Transport Protocol (RTP) packet;
   a second calculating circuitry configured to calculate a transmission bit rate of the data transmitter which is requested by the data receiver based on the estimated downlink reception bit rate and the calculated downlink packet loss rate of RTP packet; and
   a first transmitting circuitry configured to transmit the TMMBR packet to the data transmitter based on the transmission bit rate of the data transmitter which is requested by the data receiver,
   wherein the estimating circuitry is configured to:
   when $t_{cur} \geq t_{start} + t_{period}$, update an average bit rate $b_{prev}$ in a last statistic period based on Equation (1), $$b_{prev} = (s_{total} - s_{prev}) \times 8/(t_{cur} - t_{start}), t_{start} > 0 \quad (1)$$

where $s_{total}$ is an accumulation value of effective load length of a current RTP packet, $s_{prev}$ is an accumulation value of effective load length of a RTP packet in the last period, $t_{cur}$ is a current time point, and $t_{start}$ is a time point when a first packet is received within the current period, $t_{period}$ is a time period, and after each statistic period ends, $t_{start}$ is reset and $s_{prev}$ is updated to be $s_{total}$; and when $t_{cur} \in [t_{start}, t_{start} + t_{period})$, update the downlink reception bit rate based on Equation (2), $$b_{est} = (1-\alpha) \cdot b_{prev} + \alpha \cdot b_{cur} \quad (2),$$

where $b_{est}$ is an estimation value of the downlink reception bit rate, $b_{prev}$ is an average bit rate in the last statistic period, and $b_{cur}$ is a current average bit rate, and $\alpha$ is a weight coefficient which depends upon Equation (3), $$\alpha = \begin{cases} \frac{3}{4}, & (t_{cur} - t_{start}) \geq 0.8 \times t_{peroid} \\ \frac{1}{2}, & 0.4 \times t_{peroid} \leq (t_{cur} - t_{start}) < 0.8 \times t_{peroid} \\ \frac{1}{4}, & 0.2 \times t_{peroid} \leq (t_{cur} - t_{start}) < 0.4 \times t_{peroid} \\ 0, & (t_{cur} - t_{start}) < 0.2 \times t_{peroid} \end{cases} \quad (3)$$

8. The device according to claim 7, wherein the first calculating hardware is configured to: if the cumulative number of RTP packets which should have been received is greater than or equal to a threshold $N_{thres}$, calculate the downlink packet loss rate $p_{loss}$ based on Equation (4), $$p_{loss} = (S_{last} - S_{start} - N_{recv})/(S_{last} - S_{start}), S_{last} - S_{start} \geq N_{thres} \quad (4),$$

where $S_{last}$ is a sequence number of a latest RTP packet, $S_{start}$ is a sequence number of a first RTP packet in a statistic period, and $N_{recv}$ is the number of RTP packets actually received in the statistic period.

9. The device according to claim 8, wherein the second calculating hardware is configured to:
   if $p_{loss} \geq p_1$ and $p_1$ is a first predetermined threshold of packet loss rate, determine n=0, initiate stepping length $h_0$, and calculate the transmission bit rate of the data transmitter $b_{TMMBR}$ based on Equations (5) and (6), $$h_0 = \beta \cdot b_{est} \quad (5)$$

$$b_{TMMBR} = b_{est} - h_n \quad (6)$$

where $\beta$ is a ratio coefficient, and $0 < \beta < 1$, and
let n=n+1, if $p_{loss} \geq p_2$ and $p_2$ is a second predetermined threshold of packet loss rate, update the stepping length $h_n$ based on Equation (7), $$h_n = \begin{cases} \beta \cdot b_{est}, & p_{loss} > p_1 \\ \lambda \cdot h_{n-1}, & p_1 > p_{loss} \geq 0 \end{cases} \quad (7)$$

where $\lambda$ is a constant, $0 < \lambda < 1$, $p^2$ is a convergence value of packet loss rate and $0 < p_2 < p_1$; or
   if $p_2 \leq p_{loss} < p_1$ and $h_n \geq h_{min}$, calculate $b_{TMMBR}$ based on Equation (6); or
   if $0 \leq p_{loss} < p_2$ and $h_n \geq h_{min}$, calculate $b_{TMMBR}$ based on Equation (8), $$b_{TMMBR} = b_{est} + h_n \quad (8).$$

10. The device according to claim 7, wherein the first transmitting circuitry is further configured to: if the data receiver does not transmit the TMMBR packet for the first time and hasn't received the TMMBN packet from the data transmitter, and the number of times the same TMMBR packet has been retransmitted does not exceed the predetermined time, transmit the TMMBR packet to the data transmitter based on a last transmission bit rate of the data transmitter which is estimated by the data receiver last time.

11. A device for adjusting bit rate in video calling based on Voice over Long-Term Evolution and Video over Long-Term Evolution (VoLTE), wherein the device is applied in a data transmitter which is adapted to receive Temporary Maximum Media Stream Bit Rate Request (TMMBR) packets, and comprises:
　a receiving circuitry configured to receive a TMMBR packet from a data receiver, wherein the TMMBR packet is sent based on a transmission bit rate of the data transmitter which is requested by the data receiver when the data receiver transmits the TMMBR packet for the first time or receives a first Temporary Maximum Media Stream Bit Rate Notification (TMMBN) packet from the data transmitter, or when the number of times the same TMMBR packet has been retransmitted exceeds a predetermined time, wherein the transmission bit rate of the data transmitter which is requested by the data receiver is calculated by the data receiver based on an estimated downlink reception bit rate and a calculated downlink packet loss rate of Real-time Transport Protocol (RTP) packet;
　a second transmitting circuitry, configured to transmit a second TMMBN packet to the data receiver;
　an analyzing circuitry, configured to analyze the TMMBR packet to obtain bit rate information requested by the data receiver;
　a third calculating circuitry, configured to calculate a coding bit rate to be configured based on the bit rate information requested by the data receiver; and
　a configuring circuitry, configured to perform coding bit rate configuration based on the coding bit rate to be configured,
　wherein the estimated downlink reception bit rate is obtained at the receiver by:
　　when $t_{cur} \geq t_{start} + t_{period}$, updating an average bit rate $b_{prev}$ in a last statistic period based on Equation (1), $$b_{prev} = (s_{total} - s_{prev}) \times 8/(t_{cur} - t_{start}), t_{start} > 0 \quad (1),$$

where $s_{total}$ is an accumulation value of effective load length of a current RTP packet, $s_{prev}$ is an accumulation value of effective load length of a RTP packet in the last period, $t_{cur}$ is a current time point, and $t_{start}$ is a time point when a first packet is received within the current period, $t_{period}$ is a time period, and after each statistic period ends, $t_{start}$ is reset and $s_{prev}$ is updated to be $s_{total}$; and
　　when $t_{cur} \in [t_{start}, t_{start} + t_{period})$, updating the downlink reception bit rate based on Equation (2), $$b_{est} = (1-\alpha) \cdot b_{prev} + \alpha \cdot b_{cur} \quad (2),$$

where $b_{est}$ is an estimation value of the downlink reception bit rate, $b_{prev}$ is an average bit rate in the last statistic period, and $b_{cur}$ is a current average bit rate, and $\alpha$ is a weight coefficient which depends upon Equation (3), $$\alpha = \begin{cases} \frac{3}{4}, & (t_{cur} - t_{start}) \geq 0.8 \times t_{period} \\ \frac{1}{2}, & 0.4 \times t_{period} \leq (t_{cur} - t_{start}) < 0.8 \times t_{period} \\ \frac{1}{4}, & 0.2 \times t_{period} \leq (t_{cur} - t_{start}) < 0.4 \times t_{period} \\ 0, & (t_{cur} - t_{start}) < 0.2 \times t_{period} \end{cases} \quad (3)$$

12. The device according to claim 11, wherein the third calculating circuitry is configured to: calculate the coding bit rate to be configured $b_{config}$ based on Equation (9), $$b_{config} = \begin{cases} b_{TMMBR}, & b_{MIN} \leq b_{TMMBR} \leq b_{MAX} \\ \min(b_{TMMBR}, b_{MAX}), & b_{TMMBR} > b_{MAX} \\ \max(b_{TMMBR}, b_{MIN}), & b_{TMMBR} < b_{MIN} \end{cases} \quad (9)$$

where $b_{TMMBR}$ is the bit rate obtained from the TMMBR packet, and $b_{MAX}$ and $b_{MIN}$ are the maximum and minimum values in a coding bit rate configuration section respectively.

13. A mobile terminal, comprising a device for adjusting bit rate in video calling based on Voice over Long-Term Evolution and Video over Long-Term Evolution (VoLTE), wherein the device is applied in a data receiver which is adapted to transmit Temporary Maximum Media Stream Bit Rate Request (TMMBR) packets, and comprises:
　a determining circuitry configured to determine whether the data receiver transmits a TMMBR packet for the first time, or whether the data receiver has received a Temporary Maximum Media Stream Bit Rate Notification (TMMBN) packet from a data transmitter, or whether the number of times a same TMMBR packet has been retransmitted exceeds a predetermined time;
　an estimating circuitry, configured to: if the data receiver transmits the TMMBR packet for the first time or has received the TMMBN packet from the data transmitter, or the number of times the same TMMBR packet has been retransmitted exceeds the predetermined time, estimate a downlink reception bit rate;
　a first calculating circuitry configured to calculate a downlink packet loss rate of Real-time Transport Protocol (RTP) packet;
　a second calculating circuitry configured to calculate a transmission bit rate of the data transmitter which is requested by the data receiver based on the estimated downlink reception bit rate and the calculated downlink packet loss rate of RTP packet; and
　a first transmitting circuitry configured to transmit the TMMBR packet to the data transmitter based on the transmission bit rate of the data transmitter which is requested by the data receiver,
　wherein the estimating circuitry is configured to:
　　when $t_{cur} \geq t_{start} + t_{period}$, update an average bit rate $b_{prev}$ in a last statistic period based on Equation (1), $$b_{prev} = (s_{total} - s_{prev}) \times 8/(t_{cur} - t_{start}), t_{start} > 0 \quad (1),$$

where $s_{total}$ is an accumulation value of effective load length of a current RTP packet, $s_{prev}$ is an accumulation value of effective load length of a RTP packet in the last period, $t_{cur}$ is a current time point, and $t_{start}$ is a time point when a first packet is received within the current period, $t_{period}$ is a time period, and after each statistic period ends, $t_{start}$ is reset and $s_{prev}$ is updated to be $s_{total}$; and
　　when $t_{cur} \in [t_{start}, t_{start} + t_{period})$, update the downlink reception bit rate based on Equation (2), $$b_{est} = (1-\alpha) \cdot b_{prev} + \alpha \cdot b_{cur} \quad (2),$$

where $b_{est}$ is an estimation value of the downlink reception bit rate, $b_{prev}$ is an average bit rate in the last statistic period, and $b_{cur}$ is a current average bit rate, and $\alpha$ is a weight coefficient which depends upon Equation (3), $$\alpha = \begin{cases} \frac{3}{4}, & (t_{cur} - t_{start}) \geq 0.8 \times t_{peroid} \\ \frac{1}{2}, & 0.4 \times t_{peroid} \leq (t_{cur} - t_{start}) < 0.8 \times t_{peroid} \\ \frac{1}{4}, & 0.2 \times t_{peroid} \leq (t_{cur} - t_{start}) < 0.4 \times t_{peroid} \\ 0, & (t_{cur} - t_{start}) < 0.2 \times t_{peroid} \end{cases} \quad (3)$$

14. The mobile terminal according to claim 13, wherein the first calculating hardware is configured to: if the cumulative number of RTP packets which should have been received is greater than or equal to a threshold $N_{thres}$, calculate the downlink packet loss rate $p_{loss}$ based on Equation (4), $$p_{loss}=(S_{last}-S_{start}-N_{recv})/(S_{last}-S_{start}), S_{last}-S_{start} \geq N_{thres} \quad (4),$$

where $S_{last}$ is a sequence number of a latest RTP packet, $S_{start}$ is a sequence number of a first RTP packet in a statistic period, and $N_{recv}$ is the number of RTP packets actually received in the statistic period.

15. The mobile terminal according to claim 13, wherein the first transmitting circuitry is further configured to: if the data receiver does not transmit the TMMBR packet for the first time and hasn't received the TMMBN packet from the data transmitter, and the number of times the same TMMBR packet has been retransmitted does not exceed the predetermined time, transmit the TMMBR packet to the data transmitter based on a last transmission bit rate of the data transmitter which is estimated by the data receiver last time.

16. A mobile terminal, comprising a device for adjusting bit rate in video calling based on Voice over Long-Term Evolution and Video over Long-Term Evolution (VoLTE), wherein the device is applied in a data transmitter which is adapted to receive Temporary Maximum Media Stream Bit Rate Request (TMMBR) packets, and comprises:

a receiving circuitry configured to receive a TMMBR packet from a data receiver, wherein the TMMBR packet is sent based on a transmission bit rate of the data transmitter which is requested by the data receiver when the data receiver transmits the TMMBR packet for the first time or receives a first Temporary Maximum Media Stream Bit Rate Notification (TMMBN) packet from the data transmitter, or when the number of times the same TMMBR packet has been retransmitted exceeds a predetermined time, wherein the transmission bit rate of the data transmitter which is requested by the data receiver is calculated by the data receiver based on an estimated downlink reception bit rate and a calculated downlink packet loss rate of Real-time Transport Protocol (RTP) packet;

a second transmitting circuitry, configured to transmit a second TMMBN packet to the data receiver;

an analyzing circuitry, configured to analyze the TMMBR packet to obtain bit rate information requested by the data receiver;

a third calculating circuitry, configured to calculate a coding bit rate to be configured based on the bit rate information requested by the data receiver; and a configuring circuitry, configured to perform coding bit rate configuration based on the coding bit rate to be configured, wherein the estimated downlink reception bit rate is obtained at the receiver by:

when $t_{cur} \geq t_{start}+t_{period}$, updating an average bit rate $b_{prev}$ in a last statistic period based on Equation (1), $$b_{prev}=(s_{total}-s_{prev}) \times 8/(t_{cur}-t_{start}), t_{start}>0 \quad (1),$$

where $s_{total}$ is an accumulation value of effective load length of a current RTP packet, $s_{prev}$ is an accumulation value of effective load length of a RTP packet in the last period, $t_{cur}$ is a current time point, and $t_{start}$ is a time point when a first packet is received within the current period, $t_{period}$ is a time period, and after each statistic period ends, $t_{start}$ is reset and $s_{prev}$ is updated to be $s_{total}$; and when $t_{cur} \in [t_{start}, t_{start}+t_{period})$, updating the downlink reception bit rate based on Equation (2), $$b_{est}=(1-\alpha) \cdot b_{prev}+\alpha \cdot b_{cur} \quad (2),$$

where $b_{est}$ is an estimation value of the downlink reception bit rate, $b_{prev}$ is an average bit rate in the last statistic period, and $b_{cur}$ is a current average bit rate, and $\alpha$ is a weight coefficient which depends upon Equation (3), $$\alpha = \begin{cases} \frac{3}{4}, & (t_{cur} - t_{start}) \geq 0.8 \times t_{peroid} \\ \frac{1}{2}, & 0.4 \times t_{peroid} \leq (t_{cur} - t_{start}) < 0.8 \times t_{peroid} \\ \frac{1}{4}, & 0.2 \times t_{peroid} \leq (t_{cur} - t_{start}) < 0.4 \times t_{peroid} \\ 0, & (t_{cur} - t_{start}) < 0.2 \times t_{peroid} \end{cases} \quad (3)$$

17. The mobile terminal according to claim 16, wherein the third calculating circuitry is configured to: calculate the coding bit rate to be configured $b_{config}$ based on Equation (9), $$b_{config} = \begin{cases} b_{TMMBR}, & b_{MIN} \leq b_{TMMBR} \leq b_{MAX} \\ \min(b_{TMMBR}, b_{MAX}), & b_{TMMBR} > b_{MAX} \\ \max(b_{TMMBR}, b_{MIN}), & b_{TMMBR} < b_{MIN} \end{cases} \quad (9)$$

where $b_{TMMBR}$ is the bit rate obtained from the TMMBR packet, and $b_{MAX}$ and $b_{MIN}$ are the maximum and minimum values in a coding bit rate configuration section respectively.

\* \* \* \* \*